US006791058B2

(12) United States Patent
Heitel et al.

(10) Patent No.: US 6,791,058 B2
(45) Date of Patent: Sep. 14, 2004

(54) AUTOMATIC LASER WELD MACHINE FOR ASSEMBLING PHOTONIC COMPONENTS

(75) Inventors: Robert G. Heitel, Laguna Beach, CA (US); Ramin Ershadi, Los Angeles, CA (US); Cathal Flanagan, Mission Viejo, CA (US); Michael Heuser, Foothill Ranch, CA (US); Douglas S. Hutchings, Rancho Cucamonga, CA (US)

(73) Assignee: Newport Corporation, Irvine, CA (US)

( * ) Notice: Subject to any disclaimer, the term of this patent is extended or adjusted under 35 U.S.C. 154(b) by 542 days.

(21) Appl. No.: 09/843,044

(22) Filed: Apr. 25, 2001

(65) Prior Publication Data

US 2002/0158051 A1 Oct. 31, 2002

(51) Int. Cl.[7] .............................................. B23K 26/20
(52) U.S. Cl. .............................. 219/121.63; 219/121.82
(58) Field of Search ....................... 219/121.63, 121.64, 219/121.65, 121.66, 121.67, 121.68, 121.69, 121.7, 121.71, 121.72, 121.82; 269/71, 903

(56) References Cited

U.S. PATENT DOCUMENTS

| 1,143,165 A | 6/1915 | Begusch |
| 1,306,906 A | 6/1919 | Jaques, Sr. |
| 2,367,139 A | 1/1945 | Ress |
| 3,357,268 A | 12/1967 | Richter |
| 3,442,475 A | 5/1969 | Rivin |
| 3,460,786 A | 8/1969 | Rivin |

(List continued on next page.)

FOREIGN PATENT DOCUMENTS

| CA | 2199423 | 3/1996 |
| GB | 2 124 402 A | 7/1982 |
| GB | 2 131 971 A | 6/1984 |
| JP | 03021894 | 1/1991 |
| JP | 08088167 | 9/1994 |
| JP | 09330875 | 6/1996 |
| JP | 10144601 | 11/1996 |

OTHER PUBLICATIONS

J. M. Kahn, C. A. Burrus, and G. Raybon, High–Stability 1.5 um External–Cavity Semiconductor Lasers for Phase–Lock Applications, Photonics Technology Letters, vol. 1, No. 7, Jul. 1989.

P. Zorabedian and W. R. Trutna, Jr., "Interference–filter––tuned, alignment–stabilized, semiconductor external–cavity laser", 1988, Optical Society of America.

(List continued on next page.)

*Primary Examiner*—Samuel M. Heinrich
(74) *Attorney, Agent, or Firm*—Irell & Manella LLP (57) ABSTRACT

An automatic handling assembly that can load and unload photonic package components into a laser station. The laser station may include three lasers that weld the package components in a horizontal position. The package components may include a sleeve coupled to an optical fiber and a fiber package. The package may be mounted to a yoke that may "gimbal" about tooling plates. The yoke may include vacuum pulled friction bands that lock and unlock the position of the package. The package tooling may also have an actuator to apply a biasing force to the yoke to offset the affects of gravity. Additionally, the package tooling may have an actuator that can couple and de-couple electrical contacts to the yoke.

85 Claims, 9 Drawing Sheets

U.S. PATENT DOCUMENTS

| | | |
|---|---|---|
| 3,478,608 A | 11/1969 | Met |
| 3,533,012 A | 10/1970 | Johnson et al. |
| 3,565,515 A | 2/1971 | De Mey, II |
| 3,577,791 A | 5/1971 | Vanden Broek |
| 3,578,278 A | 5/1971 | Pickering |
| 3,601,476 A | 8/1971 | MacKenzie |
| 3,620,558 A | 11/1971 | MacMillan |
| 3,667,525 A | 6/1972 | Spieth |
| 3,751,025 A | 8/1973 | Beery et al. |
| 3,917,201 A | 11/1975 | Roll |
| 3,945,246 A | 3/1976 | Wadensten |
| 4,030,811 A | 6/1977 | Khoe et al. |
| 4,065,203 A | 12/1977 | Goell et al. |
| 4,079,404 A | 3/1978 | Comerford et al. |
| 4,088,396 A | 5/1978 | Edelstein |
| 4,119,363 A | 10/1978 | Camlibel et al. |
| 4,144,504 A | 3/1979 | Leggett et al. |
| 4,164,363 A | 8/1979 | Hsu |
| 4,167,744 A | 9/1979 | Nyul |
| 4,199,222 A | 4/1980 | Ikushima et al. |
| 4,237,474 A | 12/1980 | Ladany |
| 4,268,113 A | 5/1981 | Noel, Jr. |
| 4,295,152 A | 10/1981 | Khoe et al. |
| 4,296,998 A | 10/1981 | Dufft |
| 4,316,678 A | 2/1982 | F'Geppert |
| 4,332,469 A | 6/1982 | Wendland |
| 4,350,867 A | 9/1982 | Kinoshita et al. |
| 4,355,323 A | 10/1982 | Kock |
| 4,357,072 A | 11/1982 | Goodfellow et al. |
| 4,387,956 A | 6/1983 | Cline |
| 4,403,243 A | 9/1983 | Hakamada |
| 4,435,037 A | 3/1984 | Abramson et al. |
| 4,469,399 A | 9/1984 | Cowen et al. |
| 4,469,929 A | 9/1984 | Rosen et al. |
| 4,479,698 A | 10/1984 | Landis et al. |
| 4,500,165 A | 2/1985 | Scholl et al. |
| 4,506,108 A | 3/1985 | Kersch et al. |
| 4,523,802 A | 6/1985 | Sakaguchi et al. |
| 4,523,810 A | 6/1985 | Goss et al. |
| 4,525,659 A | 6/1985 | Imahashi et al. |
| 4,550,410 A | 10/1985 | Chenausky et al. |
| 4,615,031 A | 9/1986 | Eales et al. |
| 4,623,220 A | 11/1986 | Grabbe et al. |
| 4,647,147 A | 3/1987 | Pikulski et al. |
| 4,647,331 A | 3/1987 | Koury, Jr. et al. |
| 4,657,429 A | 4/1987 | Morris |
| 4,664,732 A | 5/1987 | Campbell et al. |
| 4,673,244 A | 6/1987 | Miles |
| 4,673,245 A | 6/1987 | Kling et al. |
| 4,677,290 A | 6/1987 | Mitch |
| 4,678,271 A | 7/1987 | Beaulieu |
| 4,679,908 A | 7/1987 | Goodwin |
| 4,701,013 A | 10/1987 | Jurczyszyn et al. |
| 4,702,556 A | 10/1987 | Ishii et al. |
| 4,708,429 A | 11/1987 | Clark et al. |
| 4,714,315 A | 12/1987 | Krause |
| 4,720,163 A | 1/1988 | Goodwin et al. |
| 4,746,195 A | 5/1988 | Auracher et al. |
| 4,747,657 A | 5/1988 | Chaoui et al. |
| 4,748,632 A | 5/1988 | Preston |
| 4,759,600 A | 7/1988 | Caron et al. |
| 4,763,979 A | 8/1988 | Heywang |
| 4,767,174 A | 8/1988 | Carenco et al. |
| 4,773,730 A | 9/1988 | Sedlmayr |
| 4,779,946 A | 10/1988 | Pimpinella et al. |
| 4,779,959 A | 10/1988 | Saunders |
| 4,782,223 A | 11/1988 | Suzuki |
| 4,787,691 A | 11/1988 | Lorenzo et al. |
| 4,800,262 A | 1/1989 | Lentine |
| 4,807,750 A | 2/1989 | Ryder et al. |
| 4,823,220 A | 4/1989 | Milster et al. |
| 4,837,768 A | 6/1989 | Schmid |
| 4,842,397 A | 6/1989 | Eisler |
| 4,850,261 A | 7/1989 | Greene |
| 4,850,671 A | 7/1989 | Finzel |
| 4,854,667 A | 8/1989 | Ebata et al. |
| 4,913,527 A | 4/1990 | Jessop |
| 4,914,867 A | 4/1990 | Saito et al. |
| 4,915,482 A | 4/1990 | Collins et al. |
| 4,916,635 A | 4/1990 | Singer et al. |
| 4,938,564 A | 7/1990 | Romero |
| 4,966,474 A | 10/1990 | Geiger |
| 4,978,910 A | 12/1990 | Knox et al. |
| 4,988,159 A | 1/1991 | Turner et al. |
| 4,988,165 A | 1/1991 | Ishii et al. |
| 5,000,415 A | 3/1991 | Sandercock |
| 5,044,719 A | 9/1991 | Nakamura |
| 5,058,124 A | 10/1991 | Cameron et al. |
| 5,062,012 A | 10/1991 | Maeda et al. |
| 5,068,749 A | 11/1991 | Patel |
| 5,077,747 A | 12/1991 | Hemmer et al. |
| 5,132,824 A | 7/1992 | Patel et al. |
| 5,138,496 A | 8/1992 | Pong |
| 5,140,470 A | 8/1992 | Luecke |
| 5,146,532 A | 9/1992 | Hodge |
| 5,150,236 A | 9/1992 | Patel |
| 5,172,160 A | 12/1992 | Van Eijk et al. |
| 5,179,618 A | 1/1993 | Anton |
| 5,183,350 A | 2/1993 | Kramer |
| 5,189,725 A | 2/1993 | Bensel, III et al. |
| 5,191,587 A | 3/1993 | Hanson et al. |
| 5,194,993 A | 3/1993 | Bedzyk |
| 5,214,735 A | 5/1993 | Henneberger et al. |
| 5,218,258 A | 6/1993 | Shirasu et al. |
| 5,218,610 A | 6/1993 | Dixon |
| 5,219,051 A | 6/1993 | Davis |
| 5,228,101 A * | 7/1993 | Lebby et al. .................. 385/91 |
| 5,251,863 A | 10/1993 | Gossman et al. |
| 5,285,995 A | 2/1994 | Gonzalez et al. |
| 5,289,559 A | 2/1994 | Wilson |
| 5,295,700 A * | 3/1994 | Crews et al. .................. 279/5 |
| 5,300,755 A | 4/1994 | Nishitani et al. |
| 5,311,278 A | 5/1994 | Rosencher |
| 5,319,435 A | 6/1994 | Melle et al. |
| 5,321,539 A | 6/1994 | Hirabayashi et al. |
| 5,327,061 A | 7/1994 | Gullapalli |
| 5,337,383 A | 8/1994 | DeAngelis et al. |
| 5,367,140 A | 11/1994 | Jonaneh et al. |
| 5,410,145 A | 4/1995 | Coroy |
| 5,428,225 A | 6/1995 | Silva et al. |
| 5,428,635 A | 6/1995 | Zhiglinsky et al. |
| 5,434,944 A | 7/1995 | Kerry et al. |
| 5,434,945 A | 7/1995 | Burek et al. |
| 5,446,519 A | 8/1995 | Makinouchi |
| 5,463,647 A | 10/1995 | Pan |
| 5,469,265 A | 11/1995 | Measures et al. |
| 5,499,261 A | 3/1996 | Welch et al. |
| 5,502,598 A | 3/1996 | Kimura et al. |
| 5,528,718 A | 6/1996 | Ray et al. |
| 5,530,547 A | 6/1996 | Arnold |
| 5,530,785 A | 6/1996 | Sakamoto et al. |
| 5,553,186 A | 9/1996 | Allen |
| 5,563,972 A | 10/1996 | Krausse et al. |
| 5,564,537 A | 10/1996 | Shoureshi |
| 5,570,444 A | 10/1996 | Janssen et al. |
| 5,581,077 A | 12/1996 | Chirovsky et al. |
| 5,598,500 A | 1/1997 | Crespel et al. |
| 5,603,387 A | 2/1997 | Beard et al. |
| 5,617,501 A | 4/1997 | Miller et al. |
| 5,619,609 A | 4/1997 | Pan et al. |
| 5,638,267 A | 6/1997 | Singhose et al. |

| | | |
|---|---|---|
| 5,638,482 A | 6/1997 | Winterhoff et al. |
| 5,653,317 A | 8/1997 | Wakui |
| 5,655,045 A | 8/1997 | Morlion et al. |
| 5,660,255 A | 8/1997 | Schubert et al. |
| 5,668,906 A | 9/1997 | Yamamura et al. |
| 5,673,350 A | 9/1997 | Song et al. |
| 5,689,607 A | 11/1997 | Vincent et al. |
| 5,717,804 A | 2/1998 | Pan et al. |
| 5,725,066 A | 3/1998 | Beard et al. |
| 5,737,132 A | 4/1998 | Luecke et al. |
| 5,745,633 A | 4/1998 | Giebel et al. |
| 5,748,821 A | 5/1998 | Schempp et al. |
| 5,751,877 A | 5/1998 | Ishizaka et al. |
| 5,757,561 A | 5/1998 | Sechrist et al. |
| 5,758,004 A | 5/1998 | Alarcon et al. |
| 5,761,360 A | 6/1998 | Grois et al. |
| 5,765,800 A | 6/1998 | Watanabe et al. |
| 5,774,614 A | 6/1998 | Gilliland et al. |
| 5,793,920 A | 8/1998 | Wilkins et al. |
| 5,793,921 A | 8/1998 | Wilkins et al. |
| 5,794,912 A | 8/1998 | Whittaker et al. |
| 5,812,958 A | 9/1998 | Mayama |
| 5,823,307 A | 10/1998 | Schubert et al. |
| 5,825,558 A | 10/1998 | Farmiga et al. |
| 5,852,519 A | 12/1998 | Do et al. |
| 5,880,894 A | 3/1999 | Blakley |
| 5,909,324 A | 6/1999 | Bryant et al. |
| 5,930,057 A | 7/1999 | Sechrist et al. |
| 5,941,920 A | 8/1999 | Schubert |
| 5,946,023 A | 8/1999 | Blanding |
| 5,963,695 A | 10/1999 | Joyce |
| 6,016,230 A | 1/2000 | Nunnally et al. |
| 6,022,005 A | 2/2000 | Gran et al. |
| 6,198,580 B1 | 3/2001 | Dallakian |
| 6,209,841 B1 | 4/2001 | Houghton, Jr. et al. |
| 6,272,272 B1 * | 8/2001 | Ford .......................... 385/52 |

OTHER PUBLICATIONS

A. Schremer and C. L. Tang, "Single–Frequency tunable external–cavity semiconductor laser using an electro–optic birefringent modulator", Appl. Phys. Lett., vol. 55, No. 1, Jul. 3, 1989.

M. W. Maeda, J. S. Patel, D. A. Smith, Chinlon Lin, M. A. Saifi, and A. Von Lehman, "An Electronically Tunable Fiber Laser with a Liquid–Crystal Etalon Filter as the Wavelength––Tuning Element", IEEE Photonics Technology Letters, vol. 2, No. 11, Nov. 1990.

Katsuhiko Hirabayashi, Hiroyuki Tsuda, and Takashi Kurokawa, "Tunable Liquid–Crystal Fabry–Perol Interferometer Filter for Wavelength–Division Multiplexing Communication Systems", Journal of Lightwave Technology, vol. 11, No. 12, Dec. 1993.

Stephen R. Mallinson, "Wavelength–selective filters for single–mode fiber WDM systems using Fabry–Perot interferometers", Applied Optics, vol. 26, No. 3, Feb. 1, 1987.

W. Gunning, J. Pasko, J. Tracy, "A liquid crystal tunable spectral filter: visible and infrared operation", SPIE vol. 268 Imaging Spectroscopy (1981).

Hiroyuki Tsuda, Katsuhiko Hirabayashi, Yuichi Tohmori, and Takashi Kurokawa, "Tunable Light Source Using a Liquid–Crystal Fabry–Perot Interferometer", IEEE Photonics Technology Letters, vol. 3, No. 6. Jun. 1991.

John R. Andrews, "Low Voltage Wavelength Tuning of an External Cavity Diode Laser Using a Nematic Liquid Crystal–Containing Birefringent Filert", IEEE Photonics Technology Letters. vol. 2, No. 5, May 1990.

N. A. Olsson and J. P. Van Der Ziel, "Performance Characteristics of 1.5–um External Cavity Semiconductor Lasers for Coherent Optical Communication", Journal Of Lighwave Technology, vol. LT–5. No. 4, Apr. 1987.

Hecht Optics Second Edition, Eugene Hecht, reprinted 1990, reference text, pp. 303 # 368.

Rivin, Eugene I., "Vibration isolation of precision equipment", Precision Engineering, 1995, pp. 41–56, vol. 17.

"Marsh Mellow Springs Vibration Isolation Design Manual", 1998, Firestone Industrial Products Company.

Rivin, Eugene I., "Shaped Elastomeric Components for Vibration Control Devices", Sound and Vibration, Jul. 1999, pp. 18–23, vol. 33, No. 7.

* cited by examiner

AUTOMATIC LASER WELD MACHINE FOR ASSEMBLING PHOTONIC COMPONENTS

BACKGROUND OF THE INVENTION

1. Field of the Invention

The present invention relates to an automated laser weld machine to weld photonic package components.

2. Background Information

Fiber optic networks typically contain a number of optical fibers interconnected by various routers, computers, switches, etc. Information is transmitted through the fibers by photo-emitters such as laser diodes. The laser diodes emit light that travels through the fiber to a photo-detector.

The end of an optical fiber is typically coupled to the photo-emitter or photo-detector in an electronic package. The package typically contains a platform that supports the emitter/detector and an outer metal housing to protect the optical components. The housing has an aperture that receives the end of the fiber. A metal sleeve is attached to the end of the fiber and then welded to the package housing. It is critical to accurately align the fiber with the emitter/detector to minimize the optical power losses in the system.

The sleeve is typically welded to the package with one or more lasers in an apparatus commonly referred to as a laser weld machine. The laser weld machine has tooling fixtures that hold the package and sleeve in place during the weld process. The package, sleeve and fiber are manually loaded onto the tooling fixtures by an operator. After the welding process is completed, the operator removes the assembled part and reloads the machine to repeat the process with another set of parts.

The tooling fixtures hold the parts in a vertical orientation such that the fiber sleeve is directly above the package during the welding process. It would be desirable to automate the loading and unloading of the parts into the weld machine. Unfortunately, present vertically orientated machines do not allow for easy access of automated placement equipment.

It is important to locate the fiber sleeve flush with the outside surface of package to insure a rigid attachment of the sleeve and the package. To compensate for initial part misalignment the tooling fixture may include a yoke that is gimbal mounted to a rigid platform. The gimbal yoke allows the package to move and "float" so that the fiber sleeve is flush with the outside surface of the package during the weld process. In a vertical orientation the gimbal is not affected by the force of gravity. Moving the gimbal to another orientation would require a scheme to compensate for gravitational forces.

BRIEF SUMMARY OF THE INVENTION

One embodiment of the present invention includes an automatic handling assembly that can load and unload photonic package components into a laser station.

DETAILED DESCRIPTION OF THE PREFERRED EMBODIMENT

Referring to the drawings more particularly by reference numbers, FIGS. 1, 2, 3 and 4 show an embodiment of an automatic laser welding machine 10 of the present invention. The welding machine 10 includes an automatic handling assembly 12 located above a laser weld station 14. The machine 10 is controlled by a computer 16. The computer 16 may contain a processor, memory, etc. and other electrical circuits required to control the machine 10. The computer 16 may control the machine 10 in accordance with software and/or firmware stored in memory.

Figure 1:
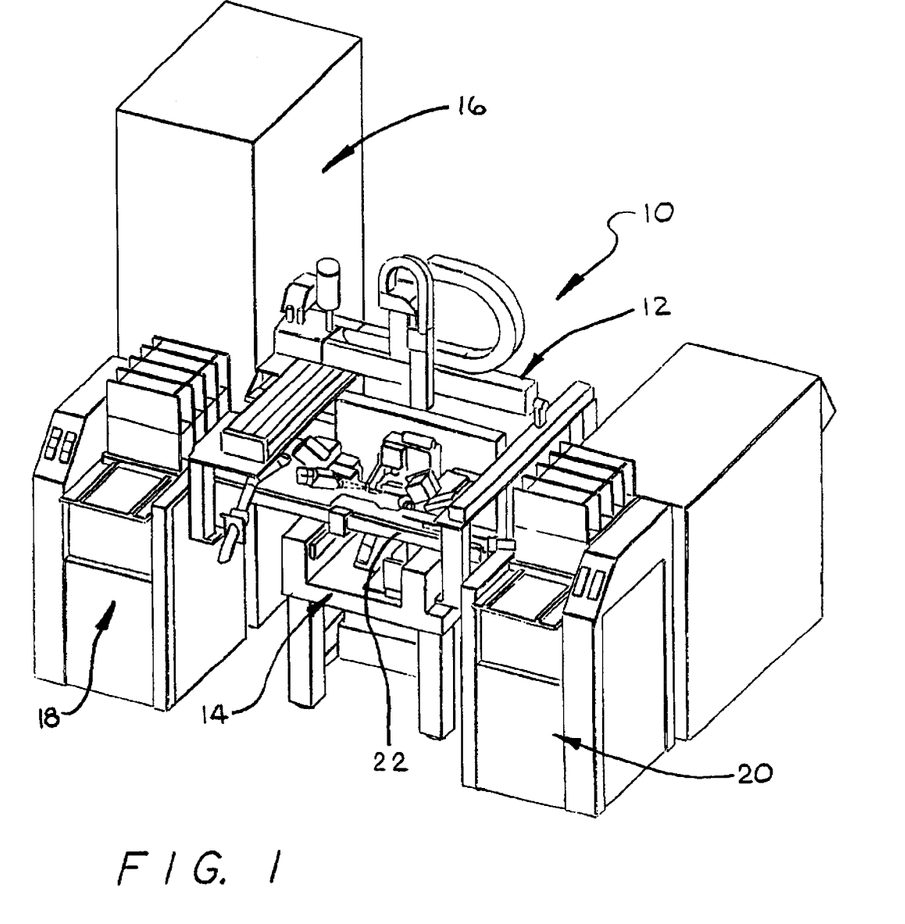
FIG. 1 is a perspective view of an embodiment of an automatic laser weld machine.
Figure 2:
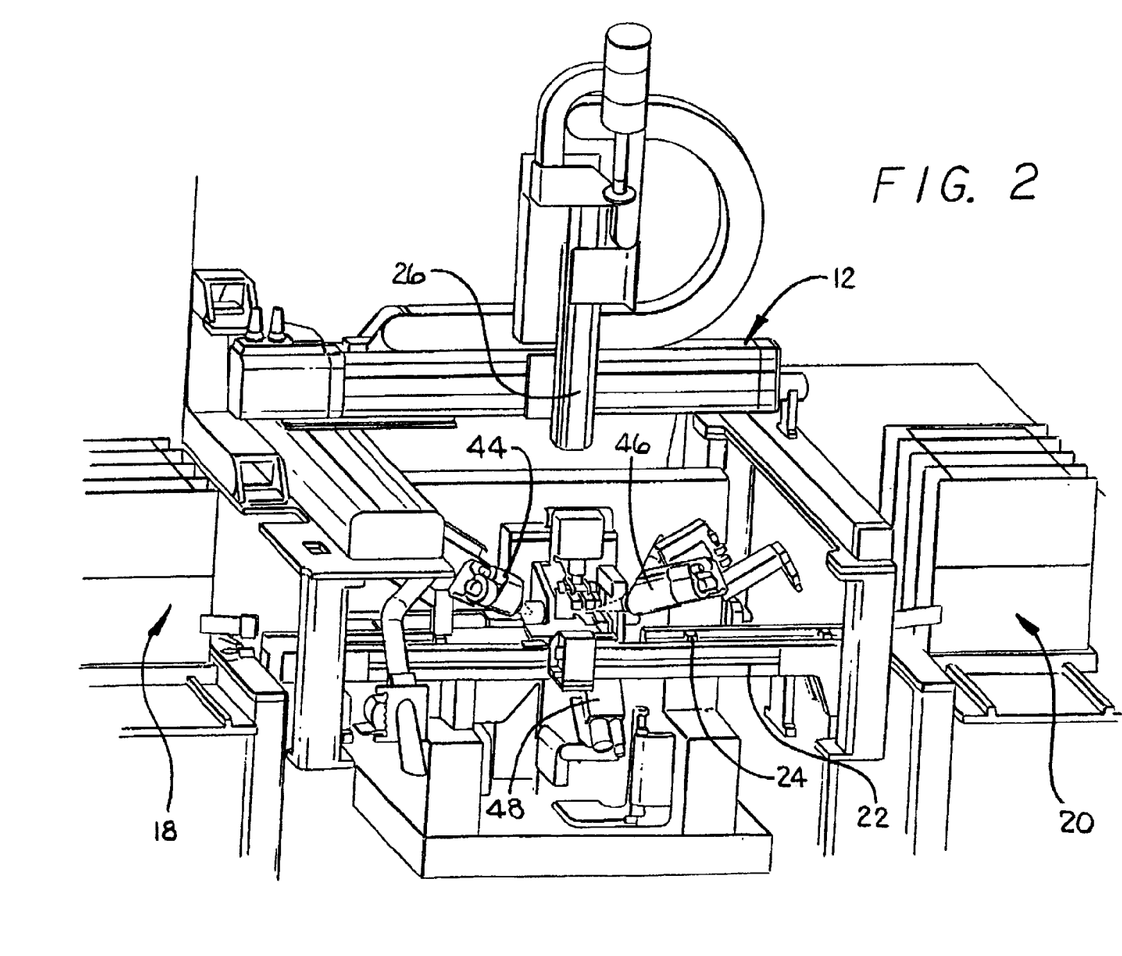
FIG. 2 is an enlarged perspective view of the automatic laser weld machine.

The machine 10 may include a load station 18 and an unload station 20. The load station 18 may include components to be assembled. The unload station may include assembled parts. The machine 10 may include a conveyor 22 to transfer parts between the stations 18 and 20. The conveyor 22 may transfer a number of trays 24 that each contain a plurality of parts.

The automatic handling assembly 12 may include a robotic arm 26 that can move parts from the trays 24 to the laser station 14, and from the laser station 14 to the trays 24. The robotic arm 26 may include an end effector 28 that can effectively grab and transfer the parts between the conveyor 22 and the laser station 14. Both the conveyor 22 and the robotic arm 26 can move in accordance with control signals from the computer 16.

Figure 3:
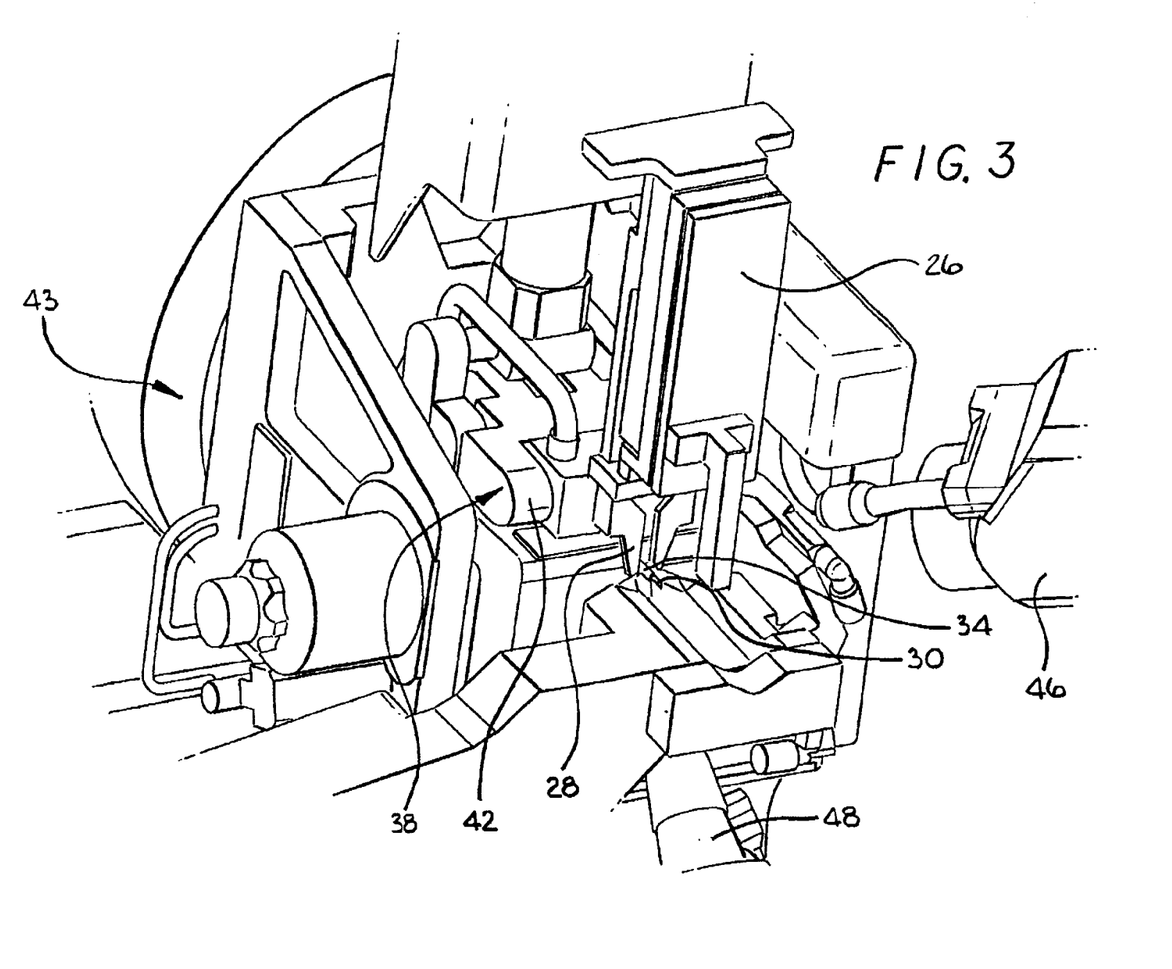
FIG. 3 is a perspective view of a laser station of the weld machine.
Figure 4:
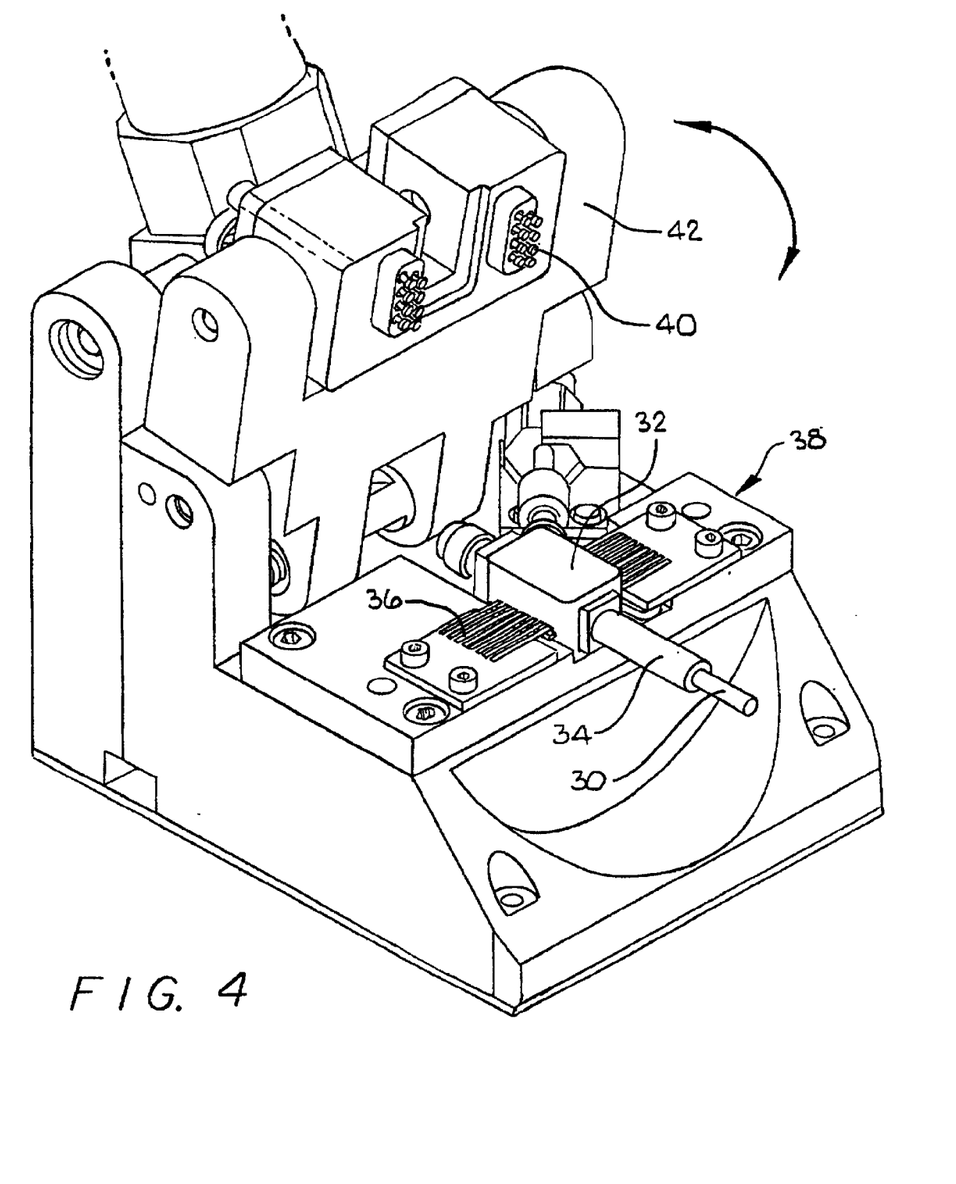
FIG. 4 is a perspective view of a package tooling of the laser station.

As shown in FIGS. 3 and 4, the parts may include an optical fiber 30 that is to be attached to a fiber module package 32. The fiber 30 may include a sleeve 34 that is welded to the package 32. The sleeve 34 can also be welded to the fiber 30 to achieve axial alignment. Both the sleeve 34 and the package 32 are typically constructed from a metal material that will weld together in response to laser energy. The package 32 typically contains a laser diode (transmitter) or a photo-detector (receiver). Although butt welding an optical fiber 30 to a fiber module package 32 using a sleeve 34 is described and shown, it is to be understood that the machine 10 can be used to perform other types of welding operations. For example, the machine 10 may be used to weld an optical fiber ferrule to an internal weld clip.

Each fiber module package 32 may include a plurality of electrical leads 36 that are electrically connected to the internal components of the package 32. The package tooling 38 of the laser station 14 may include a plurality of electrical contacts 40 that can be placed into contact with the leads 36. The electrical contacts 40 may be located on a pivot bar 42 that can rotate as indicated by the arrows in FIG. 4. Rotating the bar 42 downward will place the contacts 40 onto the leads 36. The contacts 40 are coupled to the computer 16 which can drive and sense the performance of the components within the package 32. For example, if the package 32 contains a laser diode, the computer 16 can drive the laser. The computer 16 may also be coupled to a photo-detector (not shown) that is coupled to the opposite end of fiber 30. The computer 16 can analyze the data from the photo-detector to determine whether the fiber 30 is properly aligned with the package 32. The bar 42 may be rotated by a pneumatic actuator (not shown) that is controlled by the computer 16. The package tooling 38 may be coupled to an x-y theta Z table 43 that can move the package 32 so that the internal optical component(s) is accurately aligned with the fiber 30.

Figure 5:
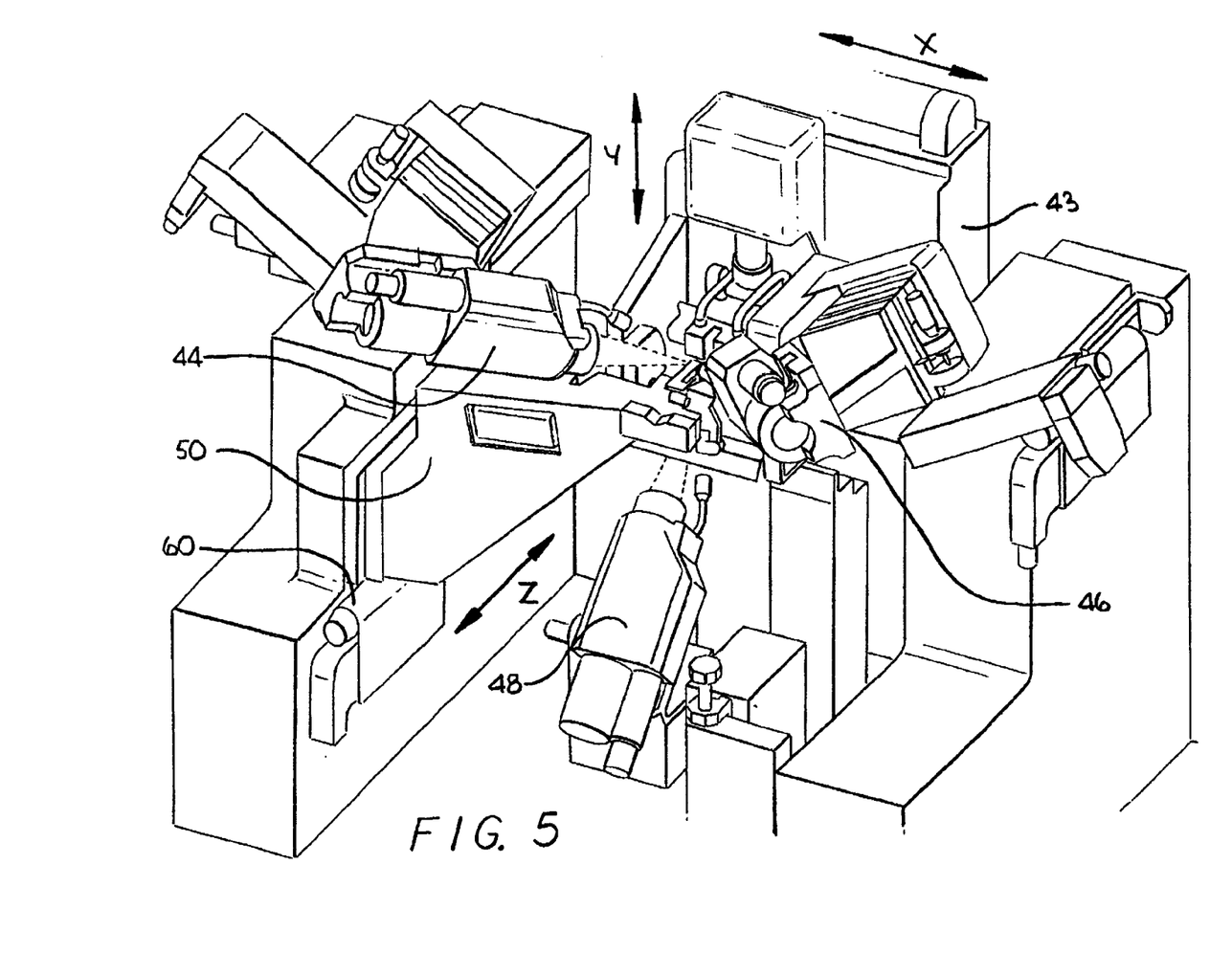
FIG. 5 is a perspective view of the laser station showing three lasers.

The laser station 14 may contain a first laser 44, a second laser 46 and a third laser 48. Each laser 44, 46 and 48 may emit a laser beam with enough energy to weld the parts loaded into the station 14. By way of example, the lasers 44, 46 and 48 may be Nd:YAG type devices. The lasers 44, 46 and 48 are positioned within the station 14 so that the fiber sleeve 34 and package 32 may be welded in a horizontal position. Horizontal welding provides space over the package tooling 38 for the automated handling assembly 12 to move the parts between the laser station 14 and the conveyor 22. Utilizing an automated handling assembly 12 more fully automates the weld process. Automating the process reduces the time and expense required to assemble the parts. Additionally, automated weld processes can increase the accuracy of the weld and the manufacturing yield of the parts.

Figure 6:
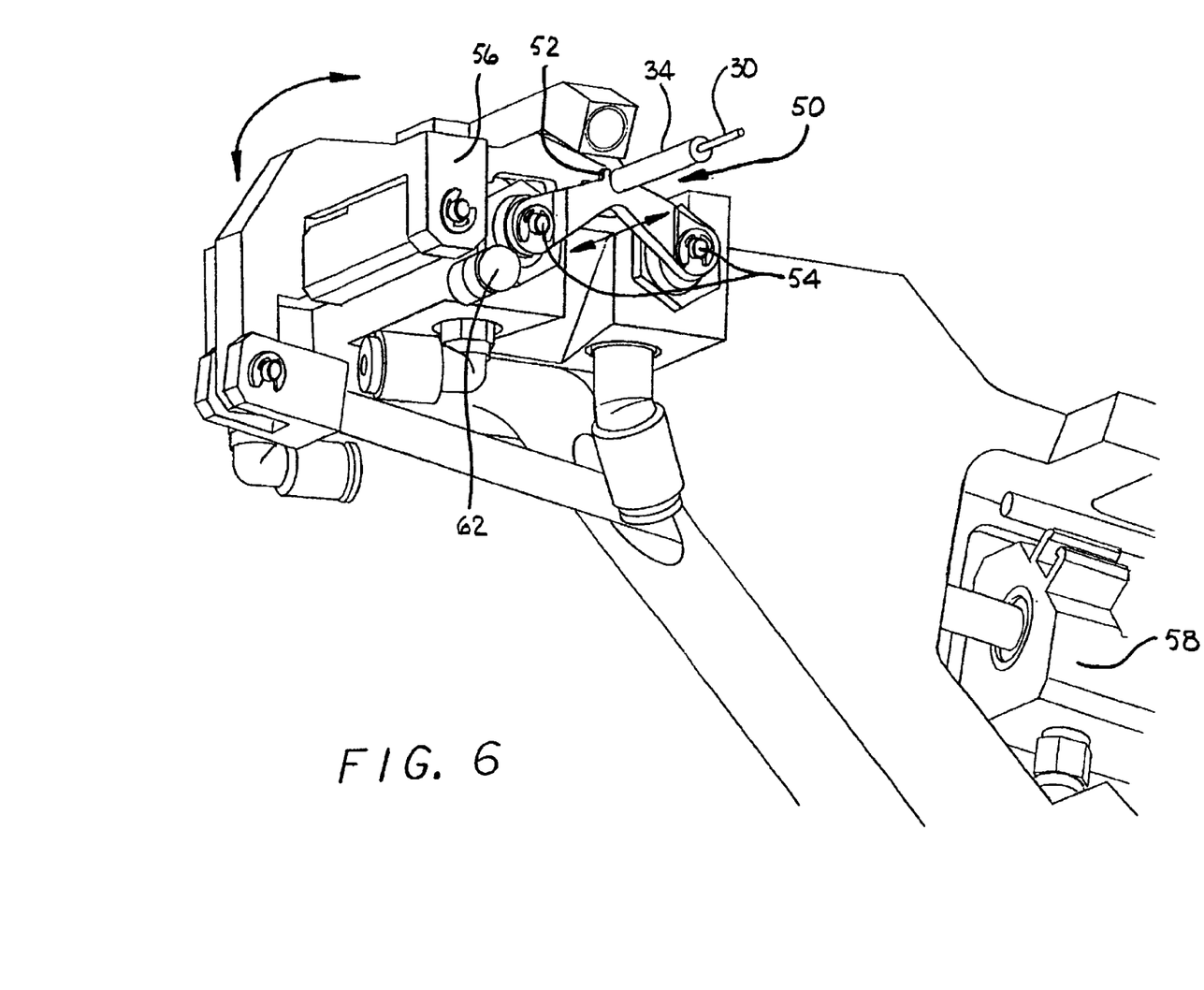
FIG. 6 is a perspective view of a fiber tooling of the laser station.

Referring to FIGS. 5 and 6, the station 14 may include a fiber tooling 50 that can load the fiber 30 and sleeve 34 adjacent to the package 32. The fiber fixture 50 may include a seat 52 that can receive the fiber sleeve 34. The seat 52 can be moved by a pair of actuators 54. The actuators 54 can move the fiber sleeve 34 toward and away from the package 32. The actuators 54 may be of the pneumatic type that are controlled by the computer 16 and a regulator valve (not shown). The computer 16 can control the regulator valve to vary the force exerted by the actuators 54. By way of example, the computer 16 may initially cause the actuators 54 to move the fiber sleeve 34 into abutment with the package 32 with a relatively high force. At another time in the process the computer 16 may vary the regulator so that the actuators 54 apply a relatively light force between the fiber sleeve 34 and the package 32. The light force may be similar to the force of gravity found in vertical weld machines. The actuators 54 may be coupled to a load cell (not shown) or other means for sensing the force applied by the sleeve 34 onto the package 32.

The fiber tooling 50 may include a rotating clamp 56 that can hold the fiber 30 in place. The clamp 56 may be rotated by a pneumatic actuator 58 that is controlled by the computer 16. As shown in FIG. 5, the entire fixture 50 can move as indicated by the arrows by an actuator 60. The actuator 60 is controlled by the computer 16. The actuator 60 moves the arm 50 when the clamp 56 has clamped the fiber 30. The actuator 60 can move the fiber sleeve 34 toward and away from the package 32. As shown in FIG. 6, the fiber tooling 50 may include a stop 62 that limits the movement of the package 32 during a package clamping operation.

Figure 7:
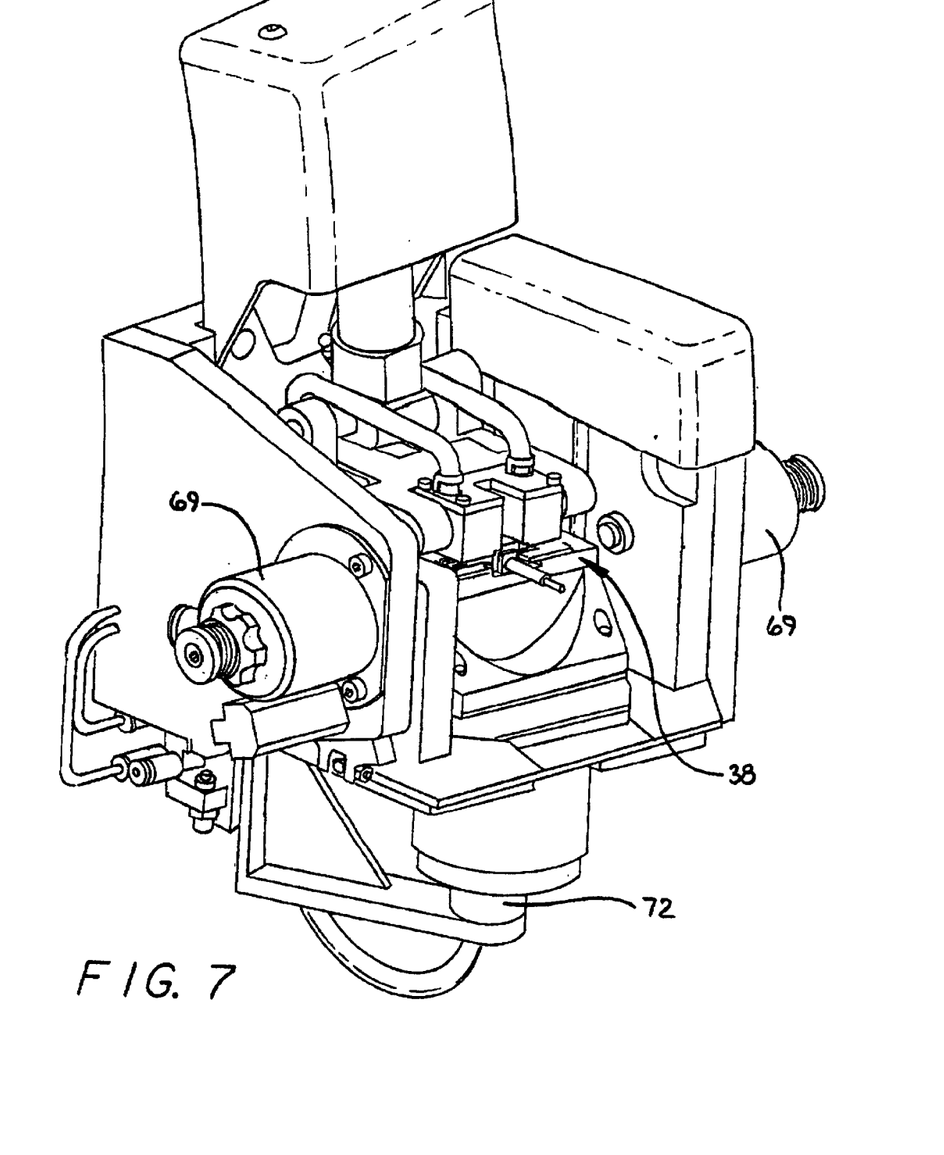
FIG. 7 is a perspective view of the package tooling.
Figure 8:
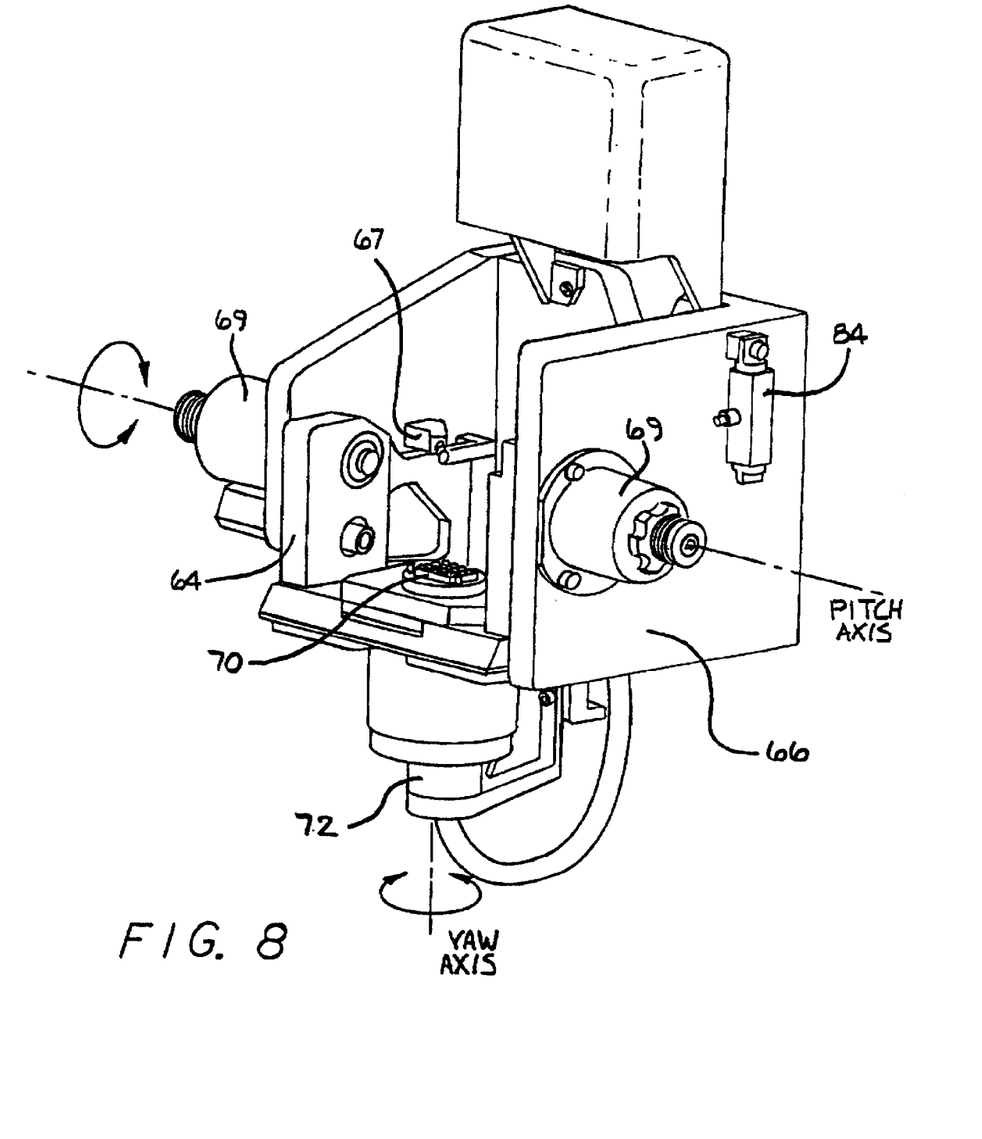
FIG. 8 is a perspective view of the package tooling with a gimbal yoke of the fixture.
Figure 9:
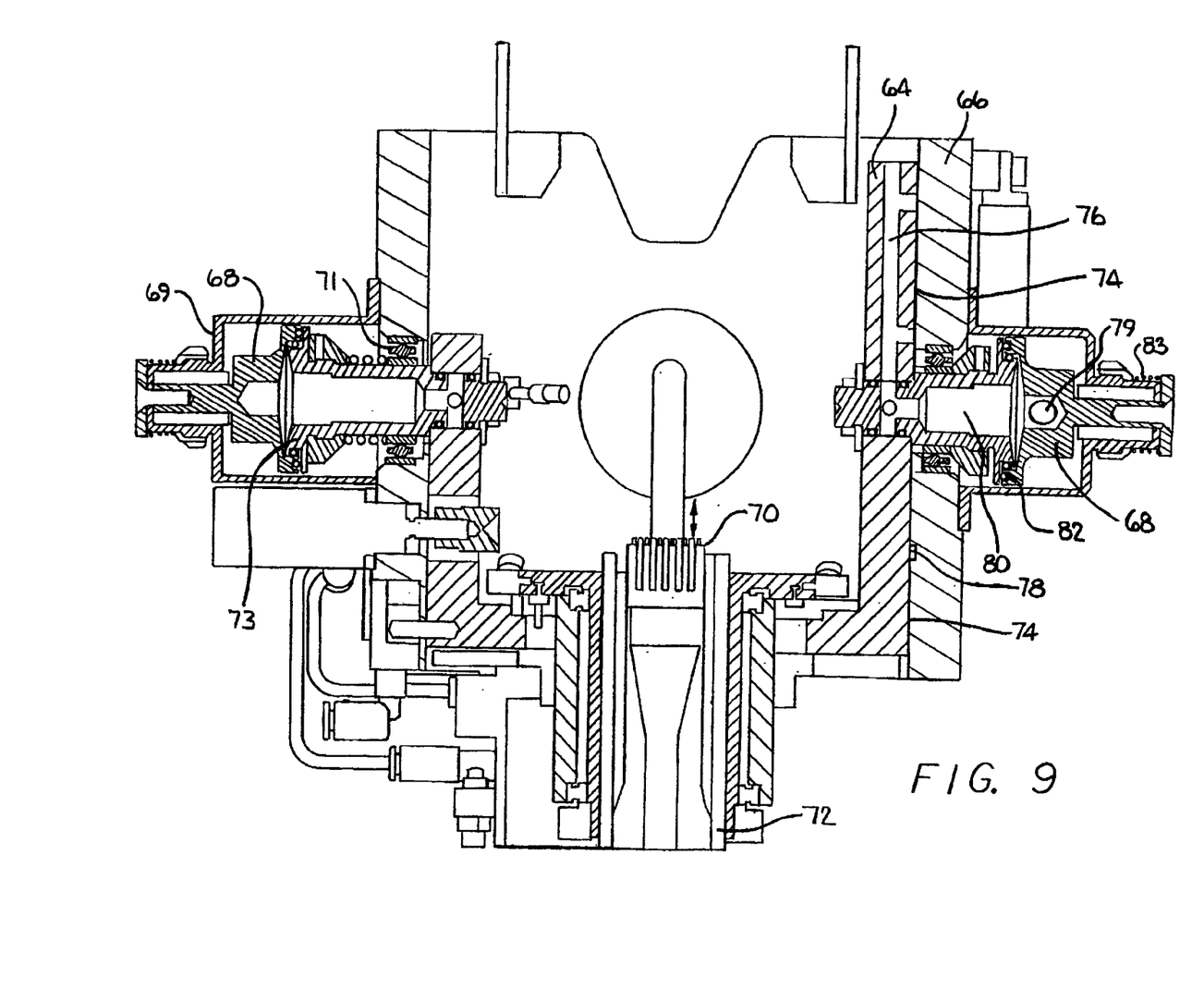
FIG. 9 is a cross-sectional view of the package tooling.

Referring to FIGS. 7, 8 and 9, the package tooling 38 may include a yoke 64 that is gimbal mounted to rigid fixture plates 66. The yoke 64 holds a yaw axis which, in turn holds the package tooling 38 and can rotate relative to the plates 66 as shown by the arrows in FIG. 8. The pitch and yaw axis motion allows the package 32 to rotate so that the fiber sleeve 34 is flush with the outer package surface.

Because the package 32 is mounted horizontally, gravity may create an imbalance in the gimballed yoke 64. To offset this imbalance the support 66 may include an actuator 67 which exerts a biasing force on the yoke 64. The biasing force balances the gimballed yoke 64 which insures that the package 32 will be nominally perpendicular with the mating face fiber sleeve 34.

The yoke 64 is coupled to the plates 66 by bearings 71. The electrical contacts 40 shown in FIG. 4, can be electrically coupled to the computer 16 through contacts 70. The contacts 70 may be moved into corresponding contacts (not shown) in the bottom of the package tooling 38 during the welding process. The contacts 70 can be moved away from the yoke 64 to allow the package 32 to gimbal and align, more easily, with the fiber sleeve 34. Coupling the computer 16 to the contacts 40 through moving contacts 70 removes mechanical forces and moments created by wires. The moments created by wires complicates the ability to balance the yoke 64. De-coupling the contacts 70 from the yoke 64 during mechanical alignment of the package 32 and sleeve 34 eliminates any imbalances created by the wires attached to the contacts 30. The contacts 70 can be moved toward and away from the yoke 64 by an actuator 72 that is controlled by the computer 16.

The yoke 64 can be locked to the plates 66 by friction bands 74. The bands 74 can be pulled into the yoke 64 by a vacuum pressure created in channels 76 within the yoke walls and the rotary coupling 68. The friction bands 74 are mechanically grounded so that when pulled to the tooling yoke 64 the bands 74 prevent rotation of the yoke 64 relative to the plates 66. The bands 74 can be pulled away from the yoke 64 by a vacuum pressure within channels 78 of the plates 66. The channels 76 and 78 are coupled to a vacuum source (not shown) through an aperture 79 in the rotary coupling 68. The aperture 79 is coupled to a hose (not shown).

The vacuum pressure will also evacuate chambers 80 and cause the rotary coupling 68 to become sealed adjacent to the bearing shaft 73 by O-rings 82. The rotary coupling 68 can be moved back to the original position by biasing springs 83. Such a sealing arrangement also eliminates the mechanical forces and moments created by air lines and hoses coupled to the yoke 64. When the rotary couplings 68 are in the position shown in FIG. 9, the hose of aperture 79 will not affect the gimbal movement of the yoke 64 and the mechanical alignment of the package 32 and sleeve 34. The package tooling 38 thus provides a gimballed yoke that is not constrained by moments created by electrical wires or pneumatic hoses.

The fixture 38 may also have a vibrator 84 that exerts a vibrational force on the pitch and yaw axis. The vibrator 84 insures that the fixture 38 does not become stuck or fixed in one position when unlocked from the plates 66.

In operation, the automated handling assembly 12 moves a package 32 onto the package tooling 38 and then loads a fiber 30 onto the seat of the fiber tooling 50. The optical fiber 30 is located away from the package 32 so that the robotic arm 26 can place a sleeve 34 onto the fiber 30.

Prior to the sleeve 34 being welded to the fiber 30 the actuators 54 move the sleeve 34 into engagement with the package 32. The gimballed yoke 64 allows the package 32 to freely rotated until the sleeve 34 is flush with the package surface. The actuators 54 provide a relatively high force to overcome the inertia and friction of the yoke 64. The friction bands 74 are then pulled into the yoke 64 to lock in the position of the package 32. The lasers 44, 46 and 48 are then activated to weld the sleeve 34 to the fiber 30, at a z-position which has been determined either by Vision Assist, Taught Position or Active Alignment.

The load cell provides feedback to the computer 16 to determine when to stop moving the sleeve 34 into and away from the package 32. For example, the computer 16 may move the sleeve 34 into the package 32 until the load cell senses a threshold force. Likewise, the computer 16 may move the sleeve 34 away from the package 32 until the sensed force falls below a threshold value.

The computer 16 then performs an alignment routine to align the fiber with the internal optical component of the package 32. For example, the computer 16 may drive a laser diode within the package 32 to emit light that travels down the fiber 30. The light intensity is sensed by a photo-detector coupled to the opposite end of the fiber 30. The x-y theta Z table 43 moves the package tooling 38 and package 32 until the photo-detector detects a maximum intensity.

The computer 16 and actuator 54 then move the sleeve 34 into abutment with the package 32. The actuators 60 may provide a force sufficient to insure contact between the sleeve 34 and the package 32. The lasers 44, 46 and 48 are then activated to weld the sleeve 34 to the package 32. The three lasers 44, 46 and 48 may provide concentric weld points about the circumference of the sleeve 34. Concentric weld points increase the weld strength between the sleeve 34 and package 32 during the weld process to insure that the fiber 30 and internal optical components maintain alignment.

After welding is completed the robotic arm 26 removes the welded package from the laser station 14, wherein the process can be repeated. The present invention thus provides a fully automated laser weld machine for photonic packages that maintains a high degree of accuracy.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An automated laser weld machine that welds together at least two photonic package components, comprising:
    a first fixture that can a hold first photonic package component in a horizontal position;
    a second fixture that can hold a second photonic package component in a horizontal position adjacent to the first photonic package component;
    a first laser that can emit a light beam to weld the first and second photonic package components;
    a second laser that can emit a light beam to weld the first and second photonic package components; and,
    a third laser that can emit a light beam to weld the first and second photonic package components.

2. The machine of claim 1, wherein the first photonic package component is a package and the second photonic package component includes a fiber sleeve attached to a fiber.

3. The machine of claim 2, wherein said first fixture has a yoke that can rotate about two orthogonal axis.

4. The machine of claim 3, wherein said first fixture includes an actuator to assert a biasing force to said yoke.

5. The machine of claim 3, wherein said first fixture includes a vibrator to apply vibratory energy to said yoke.

6. The machine of claim 3, wherein said first fixture includes a friction band that can lock a position of said yoke.

7. The machine of claim 6, wherein said first fixture includes a vacuum channel that pulls said friction band into said yoke.

8. The machine of claim 7, wherein said first fixture has a vacuum channel that pulls said friction band away from said yoke.

9. The machine of claim 3, wherein said first fixture has a plurality of first electrical contacts that can be coupled to the package, and an actuator that moves said electrical contacts.

10. The machine of claim 9, wherein said first fixture includes a plurality of second contacts that can be coupled to said first contacts, and an actuator to move said second contacts relative to said yoke.

11. The machine of claim 6, wherein said first fixture includes a pair of rotary couplings that are pulled into said yoke with a vacuum pressure.

12. The machine of claim 3, wherein said second fixture includes an actuator to move the fiber sleeve into the package.

13. The machine of claim 12, wherein said actuator can vary a force applied by the fiber sleeve to the package.

14. An automated laser weld machine that welds together at least two photonic package components, comprising:
    first fixture means for holding a first photonic package component in a horizontal position;
    second fixture means for holding a second photonic package component in a horizontal position adjacent to the first photonic package component;
    first welding means for welding the first and second photonic package components;
    second welding means for welding the first and second photonic package components; and,
    third welding means for welding the first and second photonic package components.

15. The machine of claim 14, wherein the first photonic package component is a package and the second photonic package component includes a fiber sleeve attached to a fiber.

16. The machine of claim 15, wherein said first fixture means includes a yoke that can rotate about two orthogonal axis.

17. The machine of claim 16, wherein said first fixture means includes an actuator to assert a biasing force to said yoke.

18. The machine of claim 16, wherein said first fixture means includes a vibrator to apply vibratory energy to said yoke.

19. The machine of claim 16, wherein said first fixture means includes a friction band that can lock a position of said yoke.

20. The machine of claim 19, wherein said first fixture means includes a vacuum channel that pulls said friction band into said yoke.

21. The machine of claim 19, wherein said first fixture means includes a vacuum channel that pulls said friction band away from said yoke.

22. The machine of claim 16, wherein said first fixture means includes a plurality of first electrical contacts that can be coupled to the package, and an actuator that moves said electrical contacts.

23. The machine of claim 22, wherein said first fixture means includes a plurality of second contacts that can be coupled to said first contacts, and an actuator to move said second contacts relative to said yoke.

24. The machine of claim 16, wherein said first fixture means includes a pair of rotary couplings that are pulled into said yoke with a vacuum pressure.

25. The machine of claim 16, wherein said second fixture means includes an actuator to move the fiber sleeve into the package.

26. The machine of claim 25, wherein said actuator can vary a force applied by the fiber sleeve to the package.

27. An automated laser weld machine that welds together at least two photonic package components, comprising:
- a first tooling that can hold a first photonic package component in a horizontal position, said first tooling having a yoke that can rotate about two orthogonal axis and an actuator that applies a biasing force to said yoke;
- a second tooling that can hold a second photonic package component in a horizontal position adjacent to the first photonic package component; and,
- a laser that can emit a light beam to weld the first and second photonic package components.

28. The machine of claim 27, wherein the first photonic package component is a package and the second photonic package component includes a fiber sleeve attached to a fiber.

29. The machine of claim 27, wherein said first tooling includes a vibrator to apply vibratory energy to said yoke.

30. The machine of claim 27, wherein said first tooling includes a friction band that can lock a position of said yoke.

31. The machine of claim 30, wherein said first tooling includes a vacuum channel that pulls said friction band into said yoke.

32. The machine of claim 30, wherein said first tooling has a vacuum channel that pulls said friction band away from said yoke.

33. The machine of claim 29, wherein said first tooling has a plurality of first electrical contacts that can be coupled to the package, and an actuator that moves said electrical contacts.

34. The machine of claim 33, wherein said first fixture includes a plurality of second contacts that can be coupled to said first contacts, and an actuator to move said second contacts relative to said yoke.

35. The machine of claim 27, wherein said first tooling includes a pair of rotary couplings that are pulled into said yoke with a vacuum pressure.

36. The machine of claim 29, wherein said second tooling includes an actuator to move the fiber sleeve into the package.

37. The machine of claim 36, wherein said actuator can vary a force applied by the fiber sleeve to the package.

38. An automated laser weld machine that welds together at least two photonic package components, comprising:
- a first tooling that can hold a first photonic package component in a horizontal position, said first tooling having a yoke that can rotate about two orthogonal axis and biasing means for applying a biasing force to said yoke;
- a second tooling that can hold a second photonic package component in a horizontal position adjacent to the first photonic package component; and,
- a laser that can emit a light beam to weld the first and second photonic package components.

39. The machine of claim 38, wherein the first photonic package component is a package and the second photonic package component includes a fiber sleeve attached to a fiber.

40. The machine of claim 38, wherein said first tooling includes a vibrator to apply vibratory energy to said yoke.

41. The machine of claim 38, wherein said first tooling includes a friction band that can lock a position of said yoke.

42. The machine of claim 41, wherein said first tooling includes a vacuum channel that pulls said friction band into said yoke.

43. The machine of claim 41, wherein said first tooling has a vacuum channel that pulls said friction band away from said yoke.

44. The machine of claim 39, wherein said first tooling has a plurality of first electrical contacts that can be coupled to the package, and an actuator that moves said electrical contacts.

45. The machine of claim 44, wherein said first tooling includes a plurality of second contacts that can be coupled to said first contacts, and an actuator to move said second contacts relative to said yoke.

46. The machine of claim 38, wherein said first tooling includes a pair of rotary couplings that are pulled into said yoke with a vacuum pressure.

47. The machine of claim 39, wherein said second tooling includes an actuator to move the fiber sleeve into the package.

48. The machine of claim 47, wherein said actuator can vary a force applied by the fiber sleeve to the package.

49. An automated laser weld machine that welds together at least two photonic package components, comprising:
- a first tooling that can hold a first photonic package component in a horizontal position, said first tooling having a yoke that can rotate about two orthogonal axis and a friction band that can lock and unlock said yoke;
- a second tooling that can hold a second photonic package component in a horizontal position adjacent to the first photonic package component; and,
- a laser that can emit a light beam to weld the first and second photonic package components.

50. The machine of claim 49, wherein the first photonic package component is a package and the second photonic package component includes a fiber sleeve attached to a fiber.

51. The machine of claim 49, wherein said first tooling includes a vibrator to apply vibratory energy to said yoke.

52. The machine of claim 49, wherein said first tooling includes a vacuum channel that pulls said friction band into said yoke.

53. The machine of claim 49, wherein said first tooling has a vacuum channel that pulls said friction band away from said yoke.

54. The machine of claim 50, wherein said first tooling has a plurality of first electrical contacts that can be coupled to the package, and an actuator that moves said electrical contacts.

55. The machine of claim 54, wherein said first tooling includes a plurality of second contacts that can be coupled to said first contacts, and an actuator to move said second contacts relative to said yoke.

56. The machine of claim 49, wherein said first tooling includes a pair of rotary couplings that are pulled into said yoke with a vacuum pressure.

57. The machine of claim 50, wherein said second tooling includes an actuator to move the fiber sleeve into the package.

58. The machine of claim 57, wherein said actuator can vary a force applied by the fiber sleeve to the package.

59. An automated laser weld machine that welds together at least two photonic package components, comprising:
- a first tooling that can hold a first photonic package component in a horizontal position, said first tooling having a yoke that can rotate about two orthogonal axis and lock means for locking and unlocking said yoke;
- a second tooling that can hold a second photonic package component in a horizontal position adjacent to the first photonic package component; and,
- a laser that can emit a light beam to weld the first and second photonic package components.

60. The machine of claim 59, wherein the first photonic package component is a package and the second photonic package component includes a fiber sleeve attached to a fiber.

61. The machine of claim 59, wherein said first tooling includes a vibrator to apply vibratory energy to said yoke.

62. The machine of claim 59, wherein said lock means includes a friction band that is pulled into said yoke.

63. The machine of claim 61, wherein said lock means includes a vacuum channel that pulls said friction band away from said yoke.

64. The machine of claim 60, wherein said first tooling has a plurality of first electrical contacts that can be coupled to the package, and an actuator that moves said electrical contacts.

65. The machine of claim 64, wherein said first tooling includes a plurality of second contacts that can be coupled to said first contacts, and an actuator to move said second contacts relative to said yoke.

66. The machine of claim 59, wherein said first tooling includes a pair of rotary couplings that are pulled into said yoke with a vacuum pressure.

67. The machine of claim 59, wherein said second tooling includes an actuator to move the fiber sleeve into the package.

68. The machine of claim 67, wherein said actuator can vary a force applied by the fiber sleeve to the package.

69. An automated laser weld machine that welds together at least two photonic package components, comprising:
a first tooling that can hold a first photonic package component in a horizontal position, said first tooling having a yoke that can rotate about two orthogonal axis, a first plurality of contacts that can engage the package, a second plurality of contacts, and an actuator that can move said second plurality of contacts into said yoke so that said second plurality of contacts are electrically coupled to said first plurality of contacts;
a second tooling that can hold a second photonic package component in a horizontal position adjacent to the first photonic package component; and,
a laser that can emit a light beam to weld the first and second photonic package components.

70. The machine of claim 69, wherein the first photonic package component is a package and the second photonic package component includes a fiber sleeve attached to a fiber.

71. The machine of claim 69, wherein said first tooling includes a vibrator to apply vibratory energy to said yoke.

72. The machine of claim 69, wherein said first tooling includes a pair of rotary couplings that are pulled into said yoke with a vacuum pressure.

73. The machine of claim 70, wherein said second tooling includes an actuator to move the fiber into the package.

74. The machine of claim 73, wherein said actuator can vary a force applied by the fiber sleeve to the package.

75. An automated laser weld machine that welds together at least two photonic package components, comprising:
a first tooling that can hold a first photonic package component, said first tooling having a yoke that can rotate about two orthogonal axis, a first plurality of contacts that can engage the package, and actuator means for coupling a second plurality of contacts to said first plurality of contacts;
a second tooling that can hold a second photonic package component adjacent to the first photonic package component; and
a laser that can emit a light beam to weld the first and second photonic package components.

76. The machine of claim 75, wherein the first photonic package component is a package and the second photonic package component includes a fiber sleeve attached to a fiber.

77. The machine of claim 75, wherein said first tooling includes a vibrator to apply vibratory energy to said yoke.

78. The machine of claim 75, wherein said first tooling includes a pair of rotary couplings that are pulled into said yoke with a vacuum pressure.

79. The machine of claim 76, wherein said second tooling includes an actuator to move the fiber sleeve into the package.

80. The machine of claim 79, wherein said actuator can vary a force applied by the fiber sleeve to the package.

81. An automated laser weld machine that welds together at least two photonic package components, comprising:
a first tooling that can hold a first photonic package component, said first tooling having a yoke that can rotate about a plurality of bearings, a friction band that locks a position of said yoke with a vacuum pressure that also moves and seals said bearings;
a second tooling that can hold a second photonic package component adjacent to the first photonic component; and,
a laser that can emit a light beam to weld the first and second photonic package components.

82. The machine of claim 81, wherein the first photonic package component is a package and the second photonic package component includes a fiber sleeve attached to a fiber.

83. The machine of claim 81, wherein said first tooling includes a vibrator to apply vibratory energy to said yoke.

84. The machine of claim 82, wherein said second tooling includes an actuator to move the fiber sleeve into the package.

85. The machine of claim 84, wherein said actuator can vary a force applied by the fiber sleeve to the package.

* * * * *